US009924437B2

United States Patent
Kawasaki

(10) Patent No.: US 9,924,437 B2
(45) Date of Patent: Mar. 20, 2018

(54) RADIO COMMUNICATION SYSTEM AND RADIO COMMUNICATION BASE STATION FOR PERMITTING HANDOVER TO A BASE STATION FOR WHICH A PREDETERMINED MEASUREMENT HAS NOT BEEN PERFORMED

(71) Applicant: KYOCERA CORPORATION, Kyoto (JP)

(72) Inventor: Toshinori Kawasaki, Higashiosaka (JP)

(73) Assignee: KYOCERA Corporation, Kyoto (JP)

( * ) Notice: Subject to any disclaimer, the term of this patent is extended or adjusted under 35 U.S.C. 154(b) by 49 days.

(21) Appl. No.: 14/350,010

(22) PCT Filed: Oct. 3, 2012

(86) PCT No.: PCT/JP2012/006340
§ 371 (c)(1),
(2) Date: Apr. 4, 2014

(87) PCT Pub. No.: WO2013/051252
PCT Pub. Date: Apr. 11, 2013

(65) Prior Publication Data
US 2014/0233533 A1 Aug. 21, 2014

(30) Foreign Application Priority Data
Oct. 5, 2011 (JP) .................................. 2011-221276

(51) Int. Cl.
*H04W 40/36* (2009.01)
*H04W 36/30* (2009.01)
(Continued)

(52) U.S. Cl.
CPC .......... *H04W 36/30* (2013.01); *H04B 17/382* (2015.01); *H04W 36/0083* (2013.01);
(Continued)

(58) Field of Classification Search
CPC . H04W 88/08; H04W 36/0061; H04W 48/16; H04W 48/20; H04W 36/08; H04W 40/36; H04W 52/343; H04B 17/382
See application file for complete search history.

(56) References Cited

U.S. PATENT DOCUMENTS

2004/0152480 A1\* 8/2004 Willars .............. H04B 7/18541
455/513
2007/0109066 A1 5/2007 McCune, Jr. et al.
(Continued)

FOREIGN PATENT DOCUMENTS

JP 2009-516397 A 4/2009
JP 2009-212847 A 9/2009
(Continued)

OTHER PUBLICATIONS

3GPP, "ETSI TS 136 331 v.9.3.0", Jul. 2010, pp. 1-250.\*
(Continued)

*Primary Examiner* — Salvador E Rivas
(74) *Attorney, Agent, or Firm* — Studebaker & Brackett PC

(57) ABSTRACT

In a radio communication system, based on a report from a connected base station, a radio communication terminal performs a predetermined measurement on other neighboring base stations and reports the result of the predetermined measurement to the base station. When a terminal performs a handover, the base station selects a base station, from among the other base stations, to be the target of the handover by the terminal based on the result of the predetermined measurement, and in predetermined circumstances, selects a base station, from among other base stations neighboring the base station, for which the predetermined measurement was not performed, to be the target of the handover by the terminal.

3 Claims, 6 Drawing Sheets

(51) Int. Cl.
   *H04B 17/382*   (2015.01)
   *H04W 36/00*    (2009.01)
   *H04W 52/34*    (2009.01)
   *H04W 36/32*    (2009.01)
(52) U.S. Cl.
   CPC ............ *H04W 40/36* (2013.01); *H04W 36/32* (2013.01); *H04W 52/343* (2013.01)

(56) References Cited

U.S. PATENT DOCUMENTS

| | | |
|---|---|---|
| 2008/0049702 A1 | 2/2008 | Meylan et al. |
| 2008/0108353 A1* | 5/2008 | Lee et al. ................ 455/437 |
| 2009/0047960 A1 | 2/2009 | Gunnarsson et al. |
| 2009/0191866 A1* | 7/2009 | Fiore ................ H04W 8/005 455/434 |
| 2011/0105109 A1 | 5/2011 | Uemura et al. |
| 2012/0142337 A1* | 6/2012 | Wang ................ H04W 24/04 455/424 |
| 2013/0090115 A1* | 4/2013 | Deivasigamani ..... H04W 48/20 455/434 |
| 2014/0233533 A1* | 8/2014 | Kawasaki ......... H04W 36/0083 370/332 |

FOREIGN PATENT DOCUMENTS

| | | |
|---|---|---|
| JP | 2010-502156 A | 1/2010 |
| JP | 2010-537480 A | 12/2010 |
| WO | 2009/150943 A1 | 12/2009 |

OTHER PUBLICATIONS

International Search Report; PCT/JP2012/006340; dated Nov. 13, 2012.

3GPP TS 36.300 V8.3.0 (Dec. 2007); 3rd Generation Partnership Project; Technical Specification Group Radio Access Network; Evolved Universal Terrestrial Radio Access (E-UTRA) and Evolved Universal Terrestrial Radio Access Network (ETRAN); Overall description; Stage 2 (Release 8); pp. 1-120.

3GPP TS 36.331 V9.3.0 (Jun. 2010); 3rd Generation Partnership Project; Technical Specification Group Radio Access Network; Evolved Universal Terrestrial Radio Access (E-UTRA); Radio Resource Control (RRC); Protocol Specification (Release 9); pp. 1-250.

* cited by examiner

| Base station | Carrier frequency (MHz) | Base station ID | Latitude (degrees) | Longitude (degrees) |
|---|---|---|---|---|
| 100B | 15bb | 2 | N34.βββ | E135.XXX |
| 100C | 15cc | 3 | N34.γγγ | E135.YYY |
| 100D | 15dd | 4 | N34.δδδ | E135.ZZZ |
| ⋮ | | | | |

RADIO COMMUNICATION SYSTEM AND RADIO COMMUNICATION BASE STATION FOR PERMITTING HANDOVER TO A BASE STATION FOR WHICH A PREDETERMINED MEASUREMENT HAS NOT BEEN PERFORMED

CROSS-REFERENCE TO RELATED APPLICATION

This application claims priority to and the benefit of Japanese Patent Application No. 2011-221276 filed Oct. 5, 2011, the entire contents of which are incorporated herein by reference.

TECHNICAL FIELD

The present invention relates to a radio communication system and radio communication terminal. In particular, the present invention relates to a radio communication system including radio communication base stations and a radio communication terminal performing a handover between the radio communication base stations, as well as to such a radio communication terminal.

BACKGROUND

The Long Term Evolution (LTE) system has been standardized in the 3rd Generation Partnership Project (3GPP) as the next generation global standard for radio communication systems. The LTE system is constituted by a radio communication terminal UE (User Equipment), a radio communication base station eNB (evolved Node B), and an EPC (Evolved Packet Core) which is the core network of an IP (Internet Protocol) base. In the present disclosure, a radio communication base station is abbreviated as a "base station" as appropriate, and a radio communication terminal (mobile terminal) is abbreviated as a "terminal" as appropriate.

Handovers in E-UTRAN (Evolved Universal Terrestrial Radio Access Network), i.e. the LTE system, have also been standardized in 3GPP (for example, see Non-patent Literature 1 and Non-patent Literature 2). The following schematically describes a handover in the LTE system as prescribed in Non-patent Literature 1 and Non-patent Literature 2.

FIG. 7 is a sequence diagram illustrating a handover within the MME (Mobility Management Equipment)/S-GW (Serving-Gateway) described in Non-patent Literature 1. In the LTE system, prior to the performance of a handover, a terminal (UE) makes a variety of measurements on other base stations neighboring the Serving Cell (Source eNB in FIG. 7), which is the cell currently serving the terminal. The terminal performs these measurements on base stations neighboring the Serving Cell based on the Measurement Configuration reported by the Serving Cell (#1 "Measurement Control" in FIG. 7). The Measurement Configuration is transmitted to the terminal by a message called an RRC Connection Reconfiguration. The measurements performed here on the base station include, for example, measurement of RSPP (Reference Signal Received Power: signal strength), RSRQ (Reference Signal Received Quality: signal quality), base station ID, and the like.

The results of measurements are reported to the Serving Cell as a Measurement Report (#2 in FIG. 7), and based on reported measurement results, the Serving Cell determines a base station to be the target of the handover performed by the terminal (Target eNB).

When a terminal performs a handover between base stations in this way, the terminal can be made not to perform the above-described measurements for a portion of the other base stations neighboring the Serving Cell. This approach may be implemented by registering, in the Measurement Configuration reported by the Serving Cell, specific base stations among the base stations neighboring the serving cell as being excluded from the above-described measurements. Thus registering a specific base station as being excluded from measurements normally made before performance of a handover is referred to below as "placing a base station on a blacklist".

This blacklist is included in a parameter called Measurement Object in the Measurement Configuration. In greater detail, when the carrier frequency of a specific base station is included in the blacklist, that base station is blacklisted. In Non-patent Literature 2, the parameters in the Measurement Configuration, including the Measurement Object, are prescribed along with other details.

There is no clear prescription in the 3GPP Standard regarding the occasion or method for placing a base station on a blacklist as described above. Accordingly, it is assumed that the occasion and method for placement on such a blacklist will be determined by agreement between the carrier and the vendor.

By thus placing specific base stations on a blacklist, specific base stations can be excluded from a variety of measurements. Accordingly, by adopting this blacklist, it has been proposed to reduce power consumption by, for example, preventing frequent measurements for Measurement Reports (for example, see Patent Literature 1). Patent Literature 1 also proposes implementing a blacklist to reduce overhead for receiving system information from a base station.

For example, when an area within a certain macrocell is covered by a plurality of microcells, and a terminal is moving at high speed through such an area on a train, car, or the like, then it is assumed that measurements will occur frequently not only for the macrocell but also for the microcells. In this example, since the terminal is moving at high speed, frequent handovers between microcells are of little value and are not desirable. Therefore, by placing base stations forming microcells on a blacklist, for example, it is possible to make only the base stations forming the macrocell the target base stations for a handover. With this approach, the processing load on the terminal can be reduced by preventing the terminal from performing frequent measurements, and power consumption can also be reduced.

CITATION LIST

Non-patent Literature 1: 3GPP TS 36.300, Chapter 10, "Mobility"
Non-patent Literature 2: 3GPP TS 36.331, Section 5.5, "Measurement"
Patent Literature 1: JP2009-516397A

SUMMARY

A number of undesirable effects, however, can also be assumed to be caused by implementing the above-described blacklist.

For example, as described above, the terminal does not perform measurements on a blacklisted base station. Therefore, in the case of a handover to a base station that has been blacklisted for some reason, the Measurement Configuration needs to be reported again to the terminal, and the measurements need to be performed again after removing the base station from the blacklist.

If placement on or removal from the blacklist were assumed to be performed manually by an operator, it would be difficult to attempt a handover dynamically to a blacklisted base station if the base stations neighboring the blacklisted base station are congested. Furthermore, when a terminal is moving at high speed toward a blacklisted base station, and the stations neighboring the blacklisted base station are congested, then a handover must be performed to the blacklisted base station. In this case, however, it is assumed that time may not allow for re-measurement after removal from the blacklist as described above. In other words, even if an attempt is made to remove a handover target base station from the blacklist and perform measurements again, communication with the handover source base station may be cut off before properly completing the handover to the target base station. If the handover is not properly executed, communication quality will worsen, which is extremely undesirable for the person performing communication.

The present invention has been conceived in light of these circumstances and provides a radio communication system and a radio communication terminal that can reduce the risk of the communication quality deteriorating when the radio communication terminal performs a handover between radio communication base stations.

A radio communication system according to a first aspect of the present invention is a radio communication system including a radio communication terminal and radio communication base stations, such that based on a report from a connected radio communication base station, the radio communication terminal performs a predetermined measurement on other radio communication base stations neighboring the connected radio communication base station and reports a result of the predetermined measurement to the connected radio communication base station, and when the radio communication terminal performs a handover, the connected radio communication base station selects a radio communication base station, from among the other radio communication base stations, to be a target of the handover by the radio communication terminal based on the result of the predetermined measurement, and in predetermined circumstances, selects a radio communication base station, from among other radio communication base stations neighboring the connected radio communication base station, for which the predetermined measurement was not performed, to be the target of the handover by the radio communication terminal A second aspect of the present invention is the radio communication system according to the first aspect, such that the connected radio communication base station selects the radio communication base station for which the predetermined measurement was not performed to be the target of the handover by the radio communication terminal in circumstances such that the radio communication terminal is moving at at least a predetermined speed toward the radio communication base station for which the predetermined measurement was not performed, and such that a radio communication base station for which the predetermined measurement was performed, and which neighbors the radio communication base station for which the predetermined measurement was not performed, is congested.

A radio communication terminal according to a third aspect of the present invention is a radio communication terminal configured to perform a predetermined measurement, based on a report from a connected radio communication base station, on other radio communication base stations neighboring the connected radio communication base station and to report on a result of the predetermined measurement to the connected radio communication base station.

According to the present invention, in a radio communication system and a radio communication terminal, the risk of the communication quality deteriorating when the radio communication terminal performs a handover between radio communication base stations can be reduced.

BRIEF DESCRIPTION OF DRAWINGS

The present invention will be further described below with reference to the accompanying drawings, wherein.

DESCRIPTION OF EMBODIMENTS

With reference to the drawings, the following describes an embodiment of the present invention.

Figure 1:
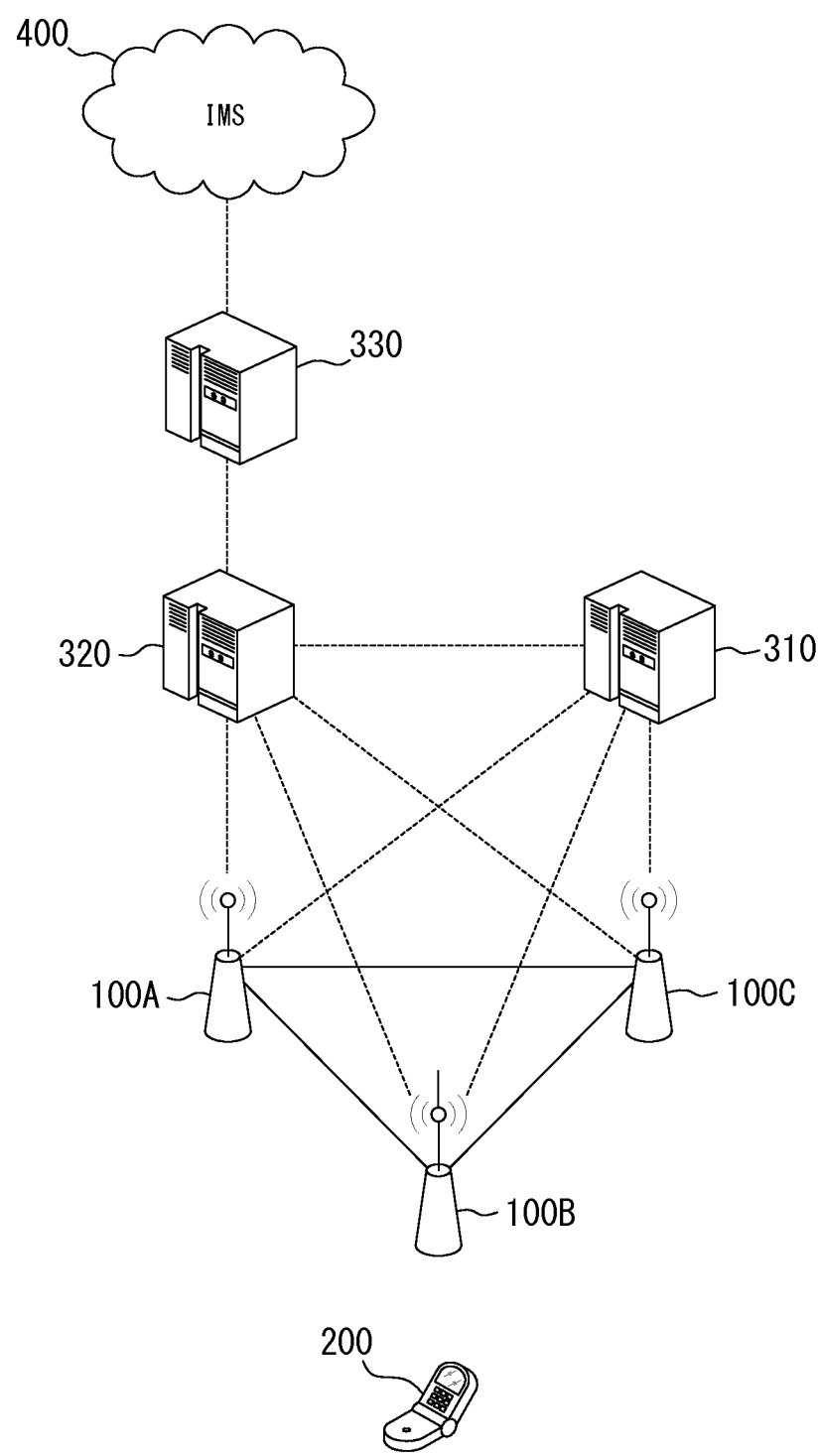
FIG. 1 schematically illustrates the structure of a radio communication system according to an embodiment of the present invention.

FIG. 1 schematically illustrates an example of the structure of a radio communication system according to an embodiment of the present invention. The radio communication system according to the present embodiment can, for example, be implemented with an LTE system.

As illustrated in FIG. 1, the radio communication system according to the present embodiment includes base stations 100, a terminal 200, Mobility Management Equipment (MME) 310, a Serving-Gateway (S-GW) 320, a PDN-Gateway (P-GW) 330, and an IP Multimedia Subsystem (IMS) 400. The example of a radio communication system illustrated in FIG. 1 includes three base stations, represented respectively as base station 100A, base station 100B, and base station 100C. These base stations form respective cells. In the radio communication system according to the present embodiment, the number of base stations may be any number two or greater.

The base station 100 reports to the terminal 200 on a setting for performing a predetermined measurement on the base stations neighboring the base station 100. The base station 100 also selects the base station that is the target of a handover based on the result of the predetermined measurement reported by the terminal 200. The terminal 200 performs radio communication via the base station 100. Based on the setting reported by the base station 100, the terminal 200 also performs a predetermined measurement on base stations neighboring the base station 100.

The MME 310 performs mobility management, such as position registration for the terminal 200, terminal call processing upon an incoming call, and handovers between base stations 100. The MME 310 also issues a request, to the S-GW, for path switching of user data (#12 "Path Switch Request" in FIG. 7) from a source base station to a target base station upon a handover in the MME/S-GW (Intra MME/S-GW). The S-GW 320 processes user data, such as voice, packets, and the like. The S-GW 320 also performs path switching of user data (#14 "Switch DL path" in FIG. 7) from the source base station to the target base station upon a handover in the MME/S-GW (Intra MME/S-GW). The P-GW 330 has an interface with the IMS 400. The IMS 400 is a public telecommunication network supporting multimedia services using Session Initiation Protocol (SIP).

In FIG. 1, the base station 100A, base station 100B, and base station 100C are connected to each other by an interface called X2. The MME 310 is connected to base station 100A, base station 100B, and base station 100C by an interface called S1-MME. The S-GW 320 is connected to base station 100A, base station 100B, and base station 100C by an interface called 51-U. The MME 310 and the S-GW 320 are connected by an interface called S11. The S-GW 320 and the P-GW 330 are connected by an interface called S5. The P-GW 330 and the IMS 400 are connected by an interface called SGi.

It is also assumed that P-GWs other than the P-GW 330 illustrated in FIG. 1 are connected to the IMS 400. Furthermore, it is assumed that the P-GWs other than the P-GW 330 are connected to a radio communication system formed by a similar node group as the base stations 100, terminal 200, MME 310, and S-GW 320 in FIG. 1.

Figure 2:
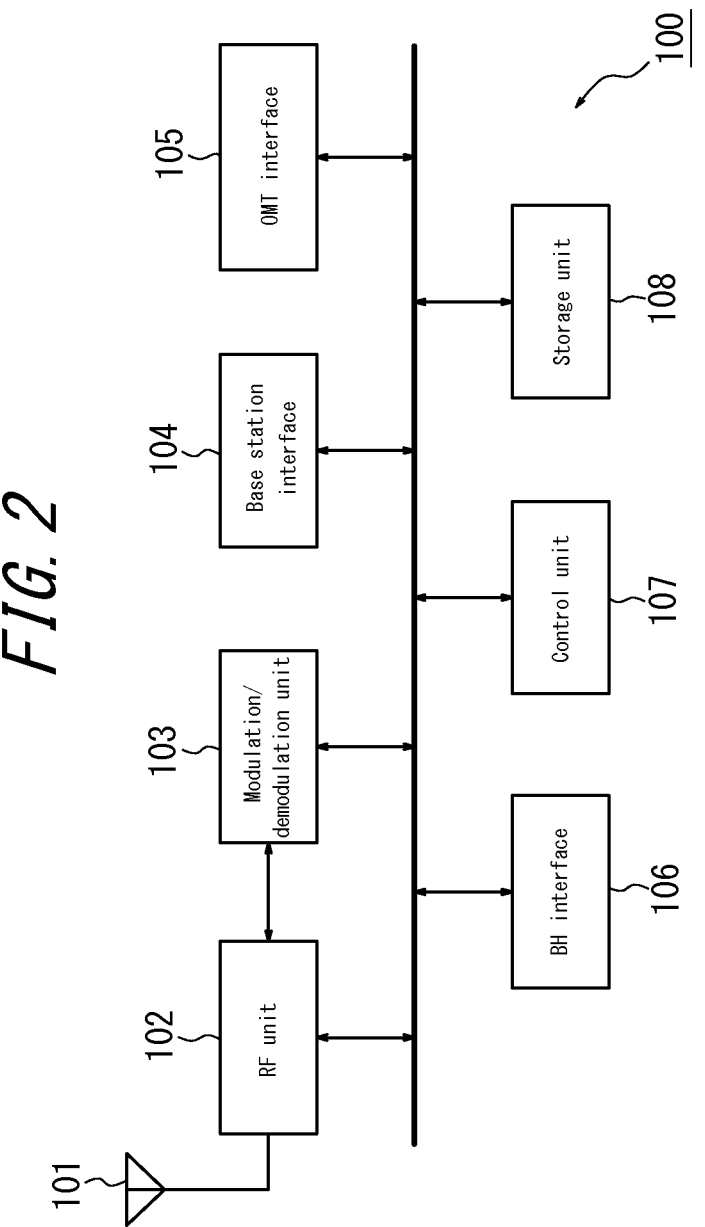
FIG. 2 schematically illustrates the structure of a base station according to an embodiment of the present invention.

FIG. 2 schematically illustrates an exemplary structure of the base station 100 in FIG. 1. As illustrated in FIG. 2, the base station 100 is provided with an RF antenna 101, an RF unit 102, a modulation/demodulation unit 103, a base station interface 104, an Operation Maintenance Tool (OMT) interface 105, a backhaul (BH) interface 106, a control unit 107, and a storage unit 108.

The RF antenna 101 transmits RF signals to the terminal 200 and receives RF signals from the terminal 200. The RF unit 102 converts the RF signals transmitted and received by the RF antenna 101 into an RF band and a band that can be processed digitally. The modulation/demodulation unit 103 modulates the signal output to the RF unit 102 and demodulates the signal input from the RF unit 102. The base station interface 104 functions as an interface with other base stations. The OMT interface 105 functions as an interface when an operator controls the base station 100 manually. The BH interface 106 functions as an interface with the core network. The control unit 107 controls and manages the entire base station 100, starting with the functional units thereof, and may be configured using a CPU. In particular, in the present embodiment, the control unit 107 performs control, when the terminal 200 performs a handover, to select a base station, from among other base stations neighboring the connected base station 100, to be the target of the handover by the terminal 200 based on the result of the predetermined measurement reported by the terminal 200. In predetermined circumstances, the control unit 107 performs control to select a base station, from among other base stations neighboring the connected base station 100, for which the predetermined measurement was not performed to be the target of the handover by the terminal 200. The control by the control unit 107 for a handover that is particular to the present embodiment is described in further detail below. The storage unit 108 is a memory that can store a variety of data.

Figure 3:
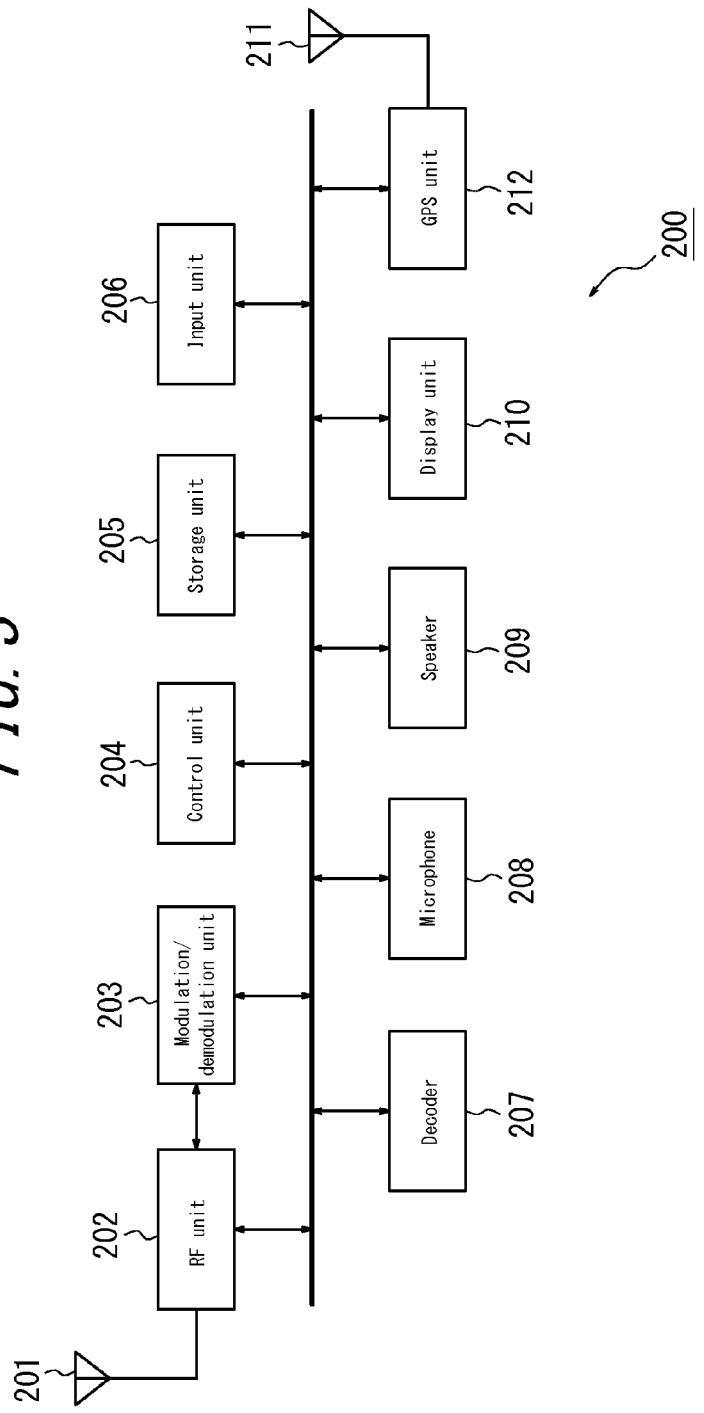
FIG. 3 schematically illustrates the structure of a terminal according to an embodiment of the present invention.

FIG. 3 schematically illustrates an exemplary structure of the terminal 200 in FIG. 1. As illustrated in FIG. 3, the terminal 200 is provided with an RF antenna 201, an RF unit 202, a modulation/demodulation unit 203, a control unit 204, a storage unit 205, an input unit 206, a decoder 207, a microphone 208, a speaker 209, a display unit 210, a GPS antenna 211, and a GPS unit 212.

The RF antenna 201 transmits RF signals to the base station 100 and receives RF signals from the base station 100. The RF unit 202 converts the RF signals transmitted and received by the RF antenna 201 into an RF band and a band that can be processed digitally. The modulation/demodulation unit 203 modulates the signal output to the RF unit 202 and demodulates the signal input from the RF unit 202. The control unit 204 controls and manages the entire terminal 200, starting with the functional units thereof, and may be configured using a CPU. In particular, in the present embodiment, based on a report from the connected base station 100, the control unit 204 performs control to make a predetermined measurement on other base stations neighboring the connected base station 100 and to report the result of the predetermined measurement to the connected base station 100. The control by the control unit 204 for a handover that is particular to the present embodiment is described in further detail below. The storage unit 205 is a memory that can store a variety of data.

The input unit 206 detects various input operations by the operator. The decoder 207 decodes audio signals and video signals. The microphone 208 detects sound and converts the sound to an electronic signal. The speaker 209 converts an electronic signal representing sound into actual sound. The display unit 210 may be configured using an LCD, an organic EL display, or the like and displays a variety of images. The GPS antenna 211 receives signals from satellites. The GPS unit 212 detects position via a Global Positioning System (GPS).

Figures 4, 5:
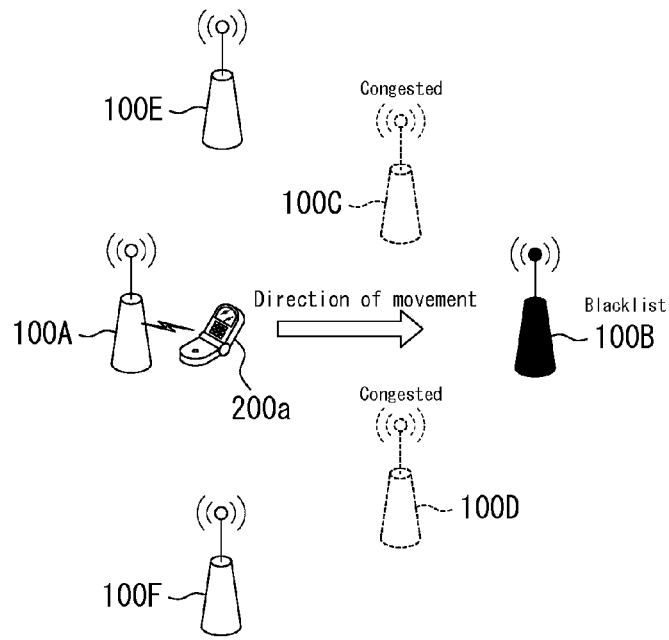
FIG. 4 conceptually illustrates processing according to an embodiment of the present invention.
FIG. 5 illustrates an example of information stored in the storage unit of a base station according to an embodiment of the present invention.

FIG. 4 illustrates the positional relationships between the base stations 100 and terminal 200 in the present invention. Below, with reference to FIG. 4, the processing for a handover in the present embodiment is described.

As illustrated in FIG. 4, six of the base stations 100, i.e. base stations 100A to 100F, are located at the illustrated positions. In other words, the other base stations 100B-F neighbor the base station 100A. The terminal 200a shown in FIG. 4 is connected to, i.e. communicating with, the base station 100A and is moving at high speed in the direction of the arrow that indicates the direction of movement. In the present invention, "high speed" is envisioned as the speed of movement when on a train or in a car, for example, and can be set to a speed exceeding approximately 60 km/h, for example. Note that in the present invention, a "high speed" is not limited to a speed exceeding approximately 60 km/h yet is preferably a speed faster than human walking speed (approximately 5 km/h).

In FIG. 4, the base station 100B is located in the direction in which the terminal 200a is traveling. The base station 100B is a base station placed on the above-mentioned blacklist and is excluded from the measurements for the Measurement Report. The base stations 100C and 100D are congested base stations.

The base stations 100A-100F store a variety of information on the neighboring base stations in their respective storage units 108. The variety of information stored in the storage unit 108 of each base station is assumed here to include the carrier frequency, base station ID, and position information (latitude, longitude, and the like) for the neighboring base stations.

FIG. 5 illustrates an example of information stored in the storage unit 108 of the base station 100A shown in FIG. 4. In the example illustrated in FIG. 5, in order from the left, the carrier frequency of each base station, ID of each base station, and latitude and longitude of the position at which each base station is located are stored in the storage unit 108 of the base station 100A.

Next, the processing sequence according to the handover of the present embodiment is described.

Figure 6:
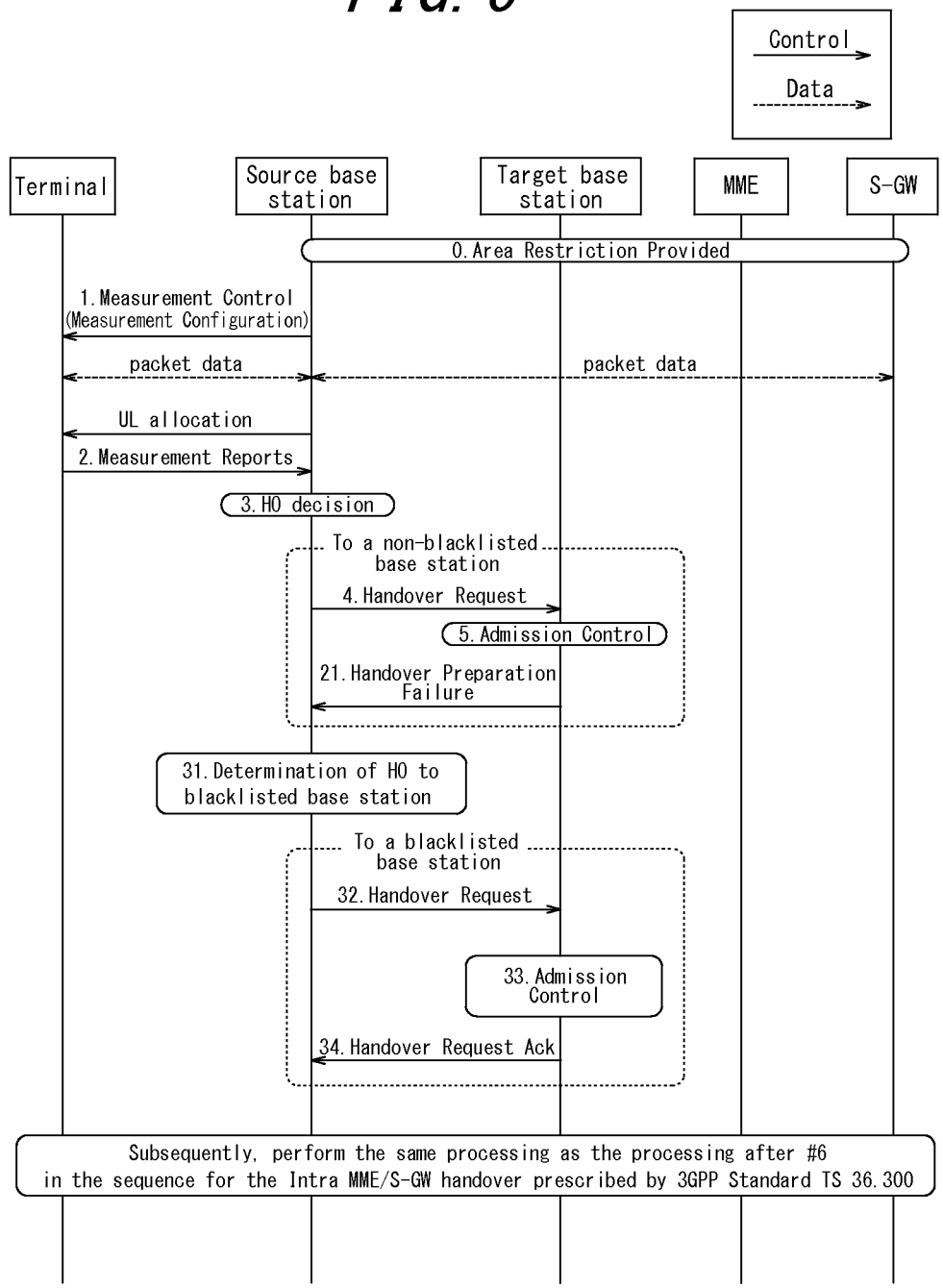
FIG. 6 is a sequence diagram illustrating processing according to an embodiment of the present invention.

FIG. 6 illustrates the sequence for the Intra MME/S-GW handover implemented in the present embodiment. Note that the sequence in FIG. 6 is for the Intra MME/S-GW handover implemented when a state such as the one illustrated in FIG. 4 occurs. In other words, in the processing sequence for a handover in the present embodiment in FIG. 6, the terminal (UE) corresponds to the terminal 200a shown in FIG. 4. The source base station (Source eNB) that is the base station to which the terminal 200a is connected corresponds to the base station 100A shown in FIG. 4. Furthermore, the target base station (Target eNB) that becomes the target when the terminal 200a performs the handover corresponds to the base stations 100B, 100C, and 100D. Note that the context of the source base station 100A related to the terminal 200a includes control information related to roaming.

First, based on the above-mentioned control information, the source base station 100A reports the Measurement Control (Measurement Configuration) to the terminal 200a that is the target of the handover (processing #1 in FIG. 6). The Measurement Object, i.e. information on the blacklisted base station 100B, is included in the Measurement Configuration.

Next, after transmitting the Measurement Configuration to the terminal 200a, the source base station 100A does not discard the Measurement Configuration but rather stores it in the storage unit 108 of the source base station 100A. The source base station 100A then allocates an uplink band to the terminal 200a (UL allocation).

After performing the above-mentioned measurements on the base stations neighboring the source base station 100A (in this example, the base stations 100C-F), the terminal 200a transmits a Measurement Report to the source base station 100A (processing #2 in FIG. 6). This Measurement Report includes information on the velocity vector of the terminal 200a. This velocity vector can, for example, be measured by the GPS unit 212, which is provided in the terminal 200a, receiving a signal from satellites via the GPS antenna 211 and calculating the position of the terminal 200a at predetermined times.

After the terminal 200a transmits the Measurement Report to the source base station 100A, based on the Measurement Report the source base station 100A selects the target base station that will be the target when the terminal 200a performs the handover (processing #3 "HO decision" in FIG. 6). The target base station need not be limited to one base station and may also be a base station group composed of a plurality of base stations. For the explanation to conform to the circumstances illustrated in FIG. 4, the target base station (group) is described here as being the base stations 100C and 100D in light of the radio propagation circumstances. In the processing up to this point, like the processing for a normal handover, the blacklisted base station (100B) is not selected as the target base station. Rather, base stations (100C and 100D) not on the blacklist are selected as the target base stations. Furthermore, the source base station 100A stores information on the velocity vector of the terminal 200a, included in the Measurement Report, in the storage unit 108.

After processing to select the target base stations, the source base station 100A issues a handover request to the target base stations 100C and 100D (processing #4 "Handover Request" in FIG. 6).

As described above, however, both the base stations 100C and 100D are congested. Accordingly, in processing #5 "Admission Control" in FIG. 6, neither of these base stations 100C and 100D can prepare a radio resource that satisfies the QoS required by the source base station 100A, and a radio bearer fails to be established. Therefore, both of these base stations 100C and 100D report failure of handover preparation to the source base station 100A (processing #21 "Handover Preparation Failure" in FIG. 6).

Upon the base stations 100C and 100D, which had been selected as the target base stations, both reporting failure of handover preparation, the source base station 100A determines whether a handover is possible for the blacklisted base station (100B) (processing #31 in FIG. 6). In this determination, the source base station 100A first verifies the information on the blacklisted base station 100B included in the Measurement Configuration and the information on the velocity vector of the terminal 200a, which are stored in the storage unit 108. Based on the information table stored in the storage unit 108, like the example illustrated in FIG. 5, the source base station 100A determines whether the current circumstances of the terminal 200a and base stations 100B-D correspond to predetermined circumstances. Here, the predetermined circumstances are preferably circumstances such that the terminal 200a is moving at at least a predetermined speed, i.e. at high speed, toward the base station 100B, and the target base stations 100C and 100D neighboring the blacklisted base station 100B are congested. When the current circumstances are determined to correspond to the above-described predetermined circumstances, the source base station 100A selects the blacklisted base station 100B for the handover.

In other words, based on a report from the connected base station 100A, the terminal 200a according to the present embodiment performs a predetermined measurement on other base stations (100C and 100D) neighboring the connected base station 100A and reports the result of the predetermined measurement to the connected base station 100A. Furthermore, when the terminal 200a performs a handover, the connected base station 100A according to the present embodiment selects a base station, from among other base stations (100C and 100D), to be the target of the handover by the terminal 200a based on the result of the predetermined measurement. In predetermined circumstances, however, the connected base station 100A selects the base station 100B, from among other base stations (100B-F) neighboring the connected base station 100A, for which the predetermined measurement was not performed to be the target of the handover by the terminal 200a. Here, the predetermined circumstances are preferably circumstances such that the terminal 200a is moving at at least a predetermined speed toward the base station 100B, for which the predetermined measurement was not performed, and such that the base stations (100C and 100D) for which the predetermined measurement was performed, and which neighbor the base station 100B for which the predetermined measurement was not performed, are congested.

Once the base station 100B is selected for the handover, the source base station 100A issues a handover request to the blacklisted base station 100B (processing #32 "Handover Request" in FIG. 6). When the base station 100B can prepare a radio resource that guarantees the QoS requested in the Admission Control, which is processing #33 in FIG. 6, and a radio bearer can be established, a handover request acknowledgement is transmitted to the source base station 100A (processing #34 "Handover Request Ack" in FIG. 6).

Figure 7:
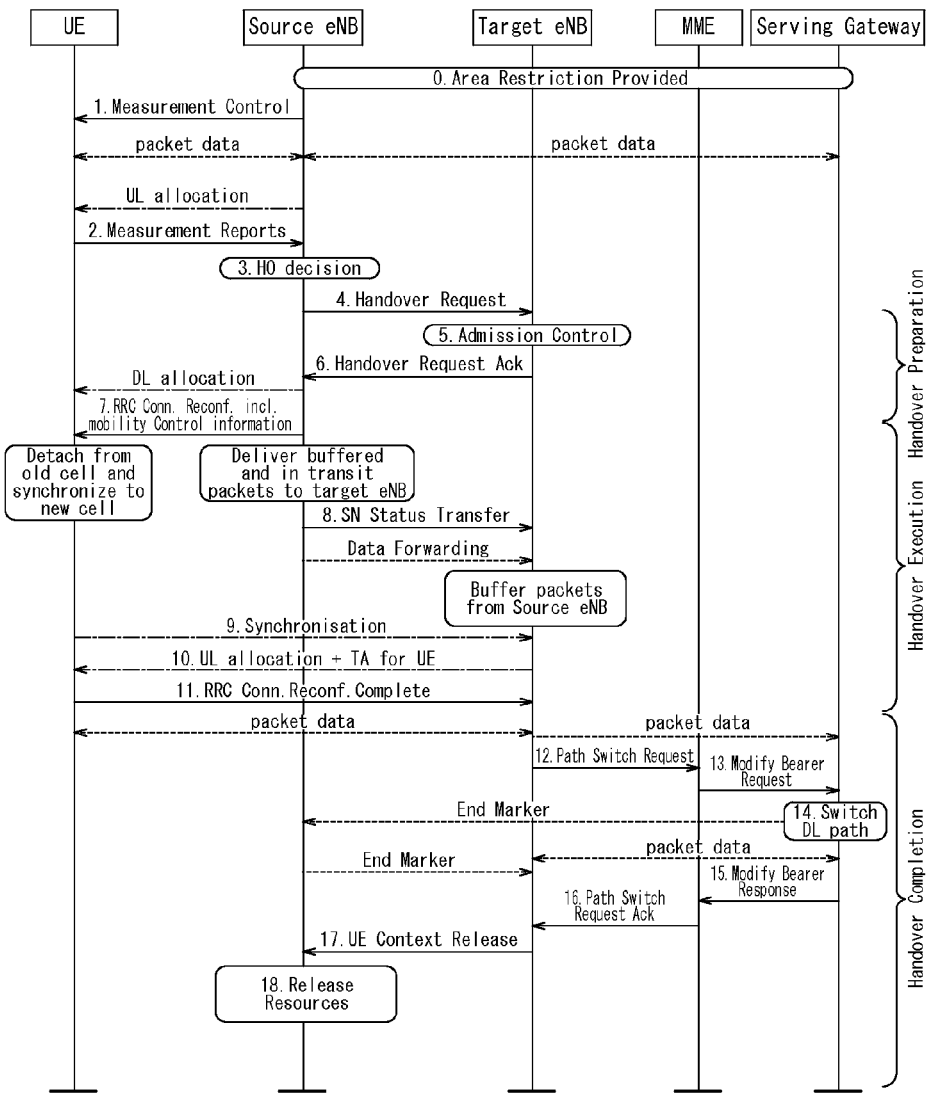
FIG. 7 is a sequence diagram illustrating a handover within the LTE system.

Subsequently, processing to perform the handover of the terminal 200a from the source base station 100A to the base station 100B can be performed in the same way as the sequence disclosed in Non-patent Literature 1, illustrated in FIG. 7. In other words, after processing #34 in FIG. 6, processing can be performed in accordance with the processing after #6 in the sequence for the Intra MME/S-GW handover illustrated in FIG. 7. Note that even if the blacklisted base station 100B reports failure of handover preparation, subsequent processing can be performed in accordance with the processing after #6 in the sequence for the Intra MME/S-GW handover illustrated in FIG. 7. Furthermore, even if the source base station 100A does not transmit a Handover Request to the blacklisted base station 100B, subsequent processing can be performed in accordance with the processing after #6 in the sequence for the Intra MME/S-GW handover illustrated in FIG. 7.

In this way, according to the present embodiment, even when a handover must be performed to a blacklisted base station, a handover is attempted to an adjacent blacklisted base station before resetting the Measurement Configuration. Therefore, the probability of communication between the terminal and the base station being cut off can be reduced. According to the present embodiment, even if an operator manually performs placement on or removal from the blacklist, attempting a handover dynamically to a blacklisted base station becomes easy when the base stations neighboring the blacklisted base station are congested. Furthermore, according to the present embodiment, the number of times measurements are performed on the base stations neighboring a terminal can be reduced, as when transmitting the Measurement Report after the Measurement Configuration. Therefore, power consumption by the terminal can be reduced.

Although the present invention has been described based on the drawings and embodiment, it should be noted that various changes and modifications will be apparent to those skilled in the art based on the present disclosure. Therefore, such changes and modifications are to be understood as included within the scope of the present invention. For example, the functions and the like included in the various members, units, and steps may be reordered in any logically consistent way. Furthermore, units or steps may be combined into one or divided.

In the above embodiment, the mobile communication system has been assumed to be LTE. The present invention is not, however, limited to LTE, and the present invention can be similarly applied to any radio communication system in which a terminal (mobile terminal) performs a handover between base stations in accordance with a processing flow similar to the processing illustrated in FIG. 7.

In the above-described example, GPS is used for acquiring position information when the terminal 200 is moving. As long as position information when the terminal 200 is moving can be acquired, however, the present invention is not limited to using GPS. For example, it is possible to adopt a configuration such as estimating the general position of the terminal 200 from information on the position of the base station 100 with which the terminal 200 is communicating, from radio field intensity, or the like.

REFERENCE SIGNS LIST

100: Radio communication base station
101: RF antenna
102: RF unit
103: Modulation/demodulation unit
104: Base station interface
105: OMT interface
106: BH interface
107: Control unit
108: Storage unit
200: Radio communication terminal
201: RF antenna
202: RF unit
203: Modulation/demodulation unit
204: Control unit
205: Storage unit
206: Input unit
207: Decoder
208: Microphone
209: Speaker
210: Display unit
211: GPS antenna
212: GPS unit
310: MME
320: S-GW
330: P-GW
400: IMS

The invention claimed is:

1. A radio communication system comprising a radio communication terminal and radio communication base stations, wherein based on a report from a source radio communication base station, the radio communication terminal performs a predetermined measurement on other radio communication base stations neighboring the source radio communication base station and reports a result of the predetermined measurement to the source radio communication base station, and when the radio communication terminal performs a handover, the source radio communication base station selects a radio communication base station, from among the other radio communication base stations, to be a target of the handover by the radio communication terminal, based on the result of the predetermined measurement, and in predetermined circumstances, the source radio communication base station selects a radio communication base station on a blacklist, from among other radio communication base stations neighboring the source radio communication base station, for which the predetermined measurement was not performed, to be the target of the handover by the radio communication terminal, wherein the radio communication base station on the blacklist is a radio communication base station for which the radio communication terminal has been instructed not to perform the predetermined measurement.

2. The radio communication system according to claim 1, wherein the source radio communication base station selects the radio communication base station for which the predetermined measurement was not performed to be the target of the handover by the radio communication terminal in circumstances such that the radio communication terminal is moving at at least a predetermined speed toward the radio communication base station for which the predetermined measurement was not performed, and such that a radio communication base station for which the predetermined measurement was performed, and which neighbors the radio communication base station for which the predetermined measurement was not performed, is congested.

3. A source radio communication base station connected to a radio communication terminal, wherein the connected radio communication terminal is configured to perform a predetermined measurement on other radio communication base stations neighboring the source radio communication base station and to report on a result of the predetermined measurement to the source radio communication base station, and wherein the source radio communication base station, when the connected radio communication terminal performs a handover, is configured to select a radio communication base station, from among the other radio communication base stations, to be a target of the handover by the connected radio communication terminal, based on the result of the predetermined measurement, and in predetermined circumstances, the source radio communication base station is configured to select a radio communication base station on a blacklist, from among other radio communication base stations neighboring the source radio communication base station, for which the predetermined measurement was not performed, to be the target of the handover by the connected radio communication terminal, wherein the radio communication base station on the blacklist is a radio communication base station for which the radio communication terminal has been instructed not to perform the predetermined measurement.

* * * * *